United States Patent
Lee et al.

(10) Patent No.: US 12,445,441 B2
(45) Date of Patent: *Oct. 14, 2025

(54) INTEGRATION OF THIRD-PARTY ENCRYPTION KEY MANAGERS WITH CLOUD SERVICES

(71) Applicant: Google LLC, Mountain View, CA (US)

(72) Inventors: Il-Sung Lee, New York, NY (US); Sidharth Durgesh Telang, New York, NY (US); Jimmy C. Chau, New York, NY (US); Timothy Matthew Dierks, Brooklyn, NY (US); Ariel Joseph Feldman, Forest Hills, NY (US); Hunter James Freyer, Long Island City, NY (US); Gregory David Laun, Jersey City, NJ (US); Tianyuan Liu, Manhasset, NY (US); Pedro Henrique Ribeiro Morais E Silva, New York, NY (US); Aditya Sinha, New York, NY (US); Xiaolan Zhang, Chappaqua, NY (US); Netanel Keidar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/186,733

(22) Filed: Mar. 20, 2023

(65) Prior Publication Data
US 2023/0231850 A1    Jul. 20, 2023

Related U.S. Application Data

(63) Continuation of application No. 16/683,025, filed on Nov. 13, 2019, now Pat. No. 11,611,558.

(51) Int. Cl.
*H04L 9/40*    (2022.01)
*H04L 9/08*    (2006.01)

(52) U.S. Cl.
CPC ........ *H04L 63/0884* (2013.01); *H04L 9/0822* (2013.01); *H04L 9/0891* (2013.01);
(Continued)

(58) Field of Classification Search
CPC ... H04L 63/06; H04L 63/083; H04L 63/0884; H04L 63/20; H04L 9/0822; H04L 9/0891
(Continued)

(56) References Cited

U.S. PATENT DOCUMENTS 8,307,209 B2   11/2012   Ng
9,779,393 B2   10/2017   Abadir et al.
(Continued)

OTHER PUBLICATIONS

Reimair et al., 2015 IEEE Trustcom/BigDataSE/ISPA, "In Certificates We Trust—Revisited" pp. 702-709 (Year: 2015).*

(Continued)

*Primary Examiner* — Khalil Naghdali
(74) *Attorney, Agent, or Firm* — Honigman LLP; Brett A. Krueger

(57) ABSTRACT

A method for integrating third-party encryption managers with cloud services includes receiving, at data processing hardware, an operation request requesting a cryptographic operation on data comprising an encryption operation or a decryption operation. When the operation is an encryption operation, the method includes transmitting a data encryption key associated with the data to a remote entity. The remote entity encrypts the data encryption key with a key encryption key and transmits the encrypted data encryption key to the data processing hardware. When the operation is a decryption operation, the method includes transmitting the encrypted data encryption key to the remote entity which causes the remote entity to decrypt the encrypted data
(Continued)

encryption key with the key encryption key and transmit the decrypted data encryption key and transmit to the data processing hardware.

18 Claims, 7 Drawing Sheets

(52) U.S. Cl.
CPC ............ *H04L 63/06* (2013.01); *H04L 63/083* (2013.01); *H04L 63/20* (2013.01)

(58) Field of Classification Search
USPC .......................................................... 713/170
See application file for complete search history.

(56) References Cited

U.S. PATENT DOCUMENTS

| | | |
|---|---|---|
| 2012/0078946 A1 | 3/2012 | Darcy |
| 2015/0281189 A1 | 10/2015 | Nayshtut et al. |
| 2016/0065363 A1 | 3/2016 | Amiri et al. |
| 2016/0112417 A1 | 4/2016 | Attia et al. |
| 2019/0089529 A1 | 3/2019 | Conway et al. |
| 2020/0311286 A1 | 10/2020 | Sofia et al. |
| 2021/0135852 A1 | 5/2021 | Spitz et al. |

OTHER PUBLICATIONS

International Search Report, Application No. PCT/US2020/059740, Dated Feb. 2, 2021, 14 pages.
Harper et al "A Security Policy Based upon Hardware Encryption", 2004 IEEE Proceedings of the 37th Hawaii International Conference on System Sciences, pp. 1-5 (Year: 2004).

* cited by examiner

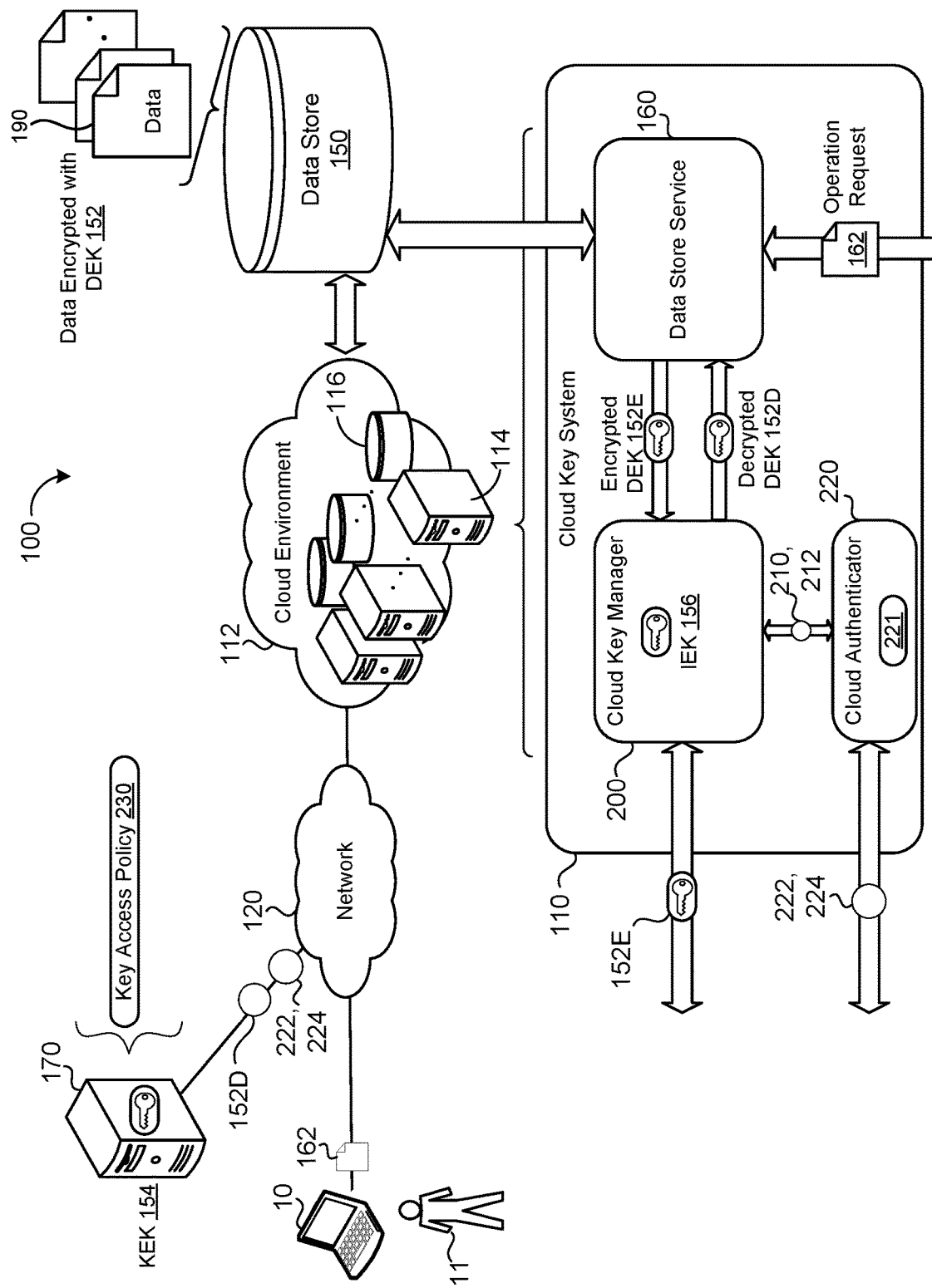

INTEGRATION OF THIRD-PARTY ENCRYPTION KEY MANAGERS WITH CLOUD SERVICES

CROSS REFERENCE TO RELATED APPLICATIONS

This U.S. patent application is a continuation of, and claims priority under 35 U.S.C. § 120 from, U.S. patent application Ser. No. 16/683,025, filed on Nov. 13, 2019. The disclosure of this prior application is considered part of the disclosure of this application and is hereby incorporated by reference in its entirety.

TECHNICAL FIELD

This disclosure relates to integrating third-party encryption key managers with cloud services.

BACKGROUND

Cloud storage systems are becoming increasingly popular due to a variety of benefits, such as increased scalability, improved data redundancy and replication, and data processing capabilities. Often, data stored in cloud storage systems is encrypted using one or more cryptographic keys. Typically, cloud service providers provide their own management services to manage these keys. The management services require that customers host the keys within the service provider's infrastructure. However, some users with highly sensitive data may desire or require full control over encryption and decryption of their data and the associated cryptographic keys.

SUMMARY

One aspect of the disclosure provides a method for integrating third-party encryption key managers with cloud services. The method includes receiving, at data processing hardware, an operation request requesting a cryptographic operation on data. The cryptographic operation includes an encryption operation or a decryption operation. When the cryptographic operation includes an encryption operation, the method includes transmitting, by the data processing hardware, a data encryption key to a remote entity that causes the remote entity to encrypt the data encryption key with a key encryption key that is unavailable to the data processing hardware. The remote entity also transmits the encrypted data encryption key to the data processing hardware. When the cryptographic operation includes a decryption operation, the method includes transmitting, by the data processing hardware, the encrypted data encryption key to the remote entity. The encrypted data encryption key when received by the remote entity causes the remote entity to decrypt the encrypted data encryption key with the key encryption key and transmit the decrypted data encryption key to the data processing hardware.

Implementations of the disclosure may include one or more of the following optional features. In some implementations, the method further includes transmitting, by the data processing hardware, an authentication request based on an identity of a client associated with the key encryption key to the remote entity. The authentication request when received by the remote entity may cause the remote entity to authenticate the identity. In some examples, when the remote entity authenticates the identity, the remote entity applies an authorization policy to the authentication request. The authorization policy includes permit criteria. In some examples, the data processing hardware includes a distributed system supporting a plurality of independent clients. In some examples, the method further includes receiving, by the data processing hardware, the decrypted data encryption key from the remote entity and authenticating, by the data processing hardware, that the decrypted data encryption key is authenticate using message authentication.

Another aspect of the disclosure provides a system for integrating third-party encryption key managers with cloud services. The system includes data processing hardware and memory hardware in communication with the data processing hardware. The memory hardware stores instructions that when executed on the data processing hardware cause the data processing hardware to perform operations. The operations include receiving an operation request requesting a cryptographic operation on data. The cryptographic operation includes an encryption operation or a decryption operation. When the cryptographic operation includes an encryption operation, the method includes transmitting a data encryption key to a remote entity that causes the remote entity to encrypt the data encryption key with a key encryption key that is unavailable to the data processing hardware. The remote entity also transmits the encrypted data encryption key to the data processing hardware. When the cryptographic operation includes a decryption operation, the method includes transmitting, by the data processing hardware, the encrypted data encryption key to the remote entity. The encrypted data encryption key when received by the remote entity causes the remote entity to decrypt the encrypted data encryption key with the key encryption key and transmit the decrypted data encryption key to the data processing hardware.

Implementations of the disclosure may include one or more of the following optional features. In some implementations, the operations further include transmitting an authentication request based on an identity of a client associated with the key encryption key to the remote entity. The authentication request when received by the remote entity may cause the remote entity to authenticate the identity. In some examples, when the remote entity authenticates the identity, the remote entity applies an authorization policy to the authentication request. The authorization policy includes permit criteria. In some examples, the data processing hardware includes a distributed system supporting a plurality of independent clients. In some examples, the operations further include receiving the decrypted data encryption key from the remote entity and authenticating that the decrypted data encryption key is authenticate using message authentication.

Another aspect of the disclosure provides a method for integrating third-party encryption key managers with cloud services. The method includes receiving, at data processing hardware, an operation request requesting a cryptographic operation on data. The cryptographic operation includes an encryption operation or a decryption operation. The method also includes transmitting, by the data processing hardware, a data encryption key to a remote entity. The data encryption key is associated with the data and encrypted by both an inner encryption key and a key encryption key. The data encryption key when received by the remote entity causes the remote entity to decrypt the data encryption key with a key encryption key and transmit the decrypted data encryption key to the data processing hardware. The key encryption key is unavailable to the data processing hardware. The method also includes decrypting, by the data processing hardware, the data encryption key received from the remote entity using the inner encryption key. The inner encryption key is unavailable to the remote entity. The method also includes executing, by the data processing hardware, the cryptographic operation on the data using the decrypted data encryption key.

Implementations of the disclosure may include one or more of the following optional features. In some implementations, the method further includes transmitting, by the data processing hardware, an authentication request to the remote entity. The authentication request when received by the remote entity causes the remote entity to authenticate the data processing hardware. In some examples, the remote entity is configured to authorize the data processing hardware using a key access policy. Optionally, the authentication request includes contextual information. In some implementations, the remote entity is configured to determine whether to authorize the data processing hardware based on the contextual information.

The contextual information may include at least one of a user name associated with the operation request, a location associated with the operation request, or a timestamp associated with the operation request. In some examples, the remote entity includes a hardware security module. Transmitting the data encryption key to the remote entity may include transmitting the data encryption key via the hypertext transfer protocol secure protocol.

In some implementations, transmitting the data encryption key to the remote entity further includes communicating with a representational state transfer application programming interface. The inner encryption key may include an AES256 key. In some examples, the method further includes authenticating, by the data processing hardware, the remote entity using a transport layer security certificate. Optionally, the method further includes, after executing the cryptographic operation on the data using the decrypted data encryption key, discarding, by the data processing hardware, the decrypted data encryption key.

Another aspect of the disclosure provides a system for integrating third-party encryption key managers with cloud services. The system includes data processing hardware and memory hardware in communication with the data processing hardware. The memory hardware stores instructions that when executed on the data processing hardware cause the data processing hardware to perform operations. The operations include receiving an operation request requesting a cryptographic operation on data. The cryptographic operation includes an encryption operation or a decryption operation. The method also includes transmitting a data encryption key to a remote entity. The data encryption key is associated with the data and encrypted by both an inner encryption key and a key encryption key. The data encryption key when received by the remote entity causes the remote entity to decrypt the data encryption key with a key encryption key and transmit the decrypted data encryption key to the data processing hardware. The key encryption key is unavailable to the data processing hardware. The method also includes decrypting the data encryption key received from the remote entity using the inner encryption key. The inner encryption key is unavailable to the remote entity. The method also includes executing the cryptographic operation on the data using the decrypted data encryption key.

This aspect may include one or more of the following optional features. In some implementations, the method further includes transmitting an authentication request to the remote entity. The authentication request when received by the remote entity causes the remote entity to authenticate the data processing hardware. In some examples, the remote entity is configured to authorize the data processing hardware using a key access policy. Optionally, the authentication request includes contextual information. In some implementations, the remote entity is configured to determine whether to authorize the data processing hardware based on the contextual information.

The contextual information may include at least one of a user name associated with the operation request, a location associated with the operation request, or a timestamp associated with the operation request. In some examples, the remote entity includes a hardware security module. Transmitting the data encryption key to the remote entity may include transmitting the data encryption key via the hypertext transfer protocol secure protocol.

In some implementations, transmitting the wrapped encrypted data encryption key to the remote entity further includes communicating with a representational state transfer application programming interface. The inner encryption key may include an AES256 key. In some examples, the method further includes authenticating the remote entity using a transport layer security certificate. Optionally, the method further includes, after executing the cryptographic operation on the data using the decrypted data encryption key, discarding the decrypted data encryption key.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a schematic view of an example cloud key system that includes a cloud authenticator.

Like reference symbols in the various drawings indicate like elements.

DETAILED DESCRIPTION

Cloud storage is increasingly being used to store large quantities of sensitive data. This sensitive data is typically encrypted and decrypted using key management services hosted by the cloud service provider. While the cloud service provider may support the ability for the customer to use the customer's own cryptographic keys, the keys are necessarily hosted in the service provider's infrastructure. Curators of highly sensitive data (e.g., financial data, health records, governmental data, etc.) may demand or require assurances that they have control over the keys and/or a trustworthy audit trail of key usage.

Implementations herein are directed toward systems and methods for a cloud service provider to support a third party encryption key manager. This support provides clients or customers of the cloud service provider flexibility to store keys in their own infrastructure or in any trusted third party service separate and independent from the cloud service provider. This allows clients to achieve separation between keys and data which allows for the support of high security and/or compliance objectives. In addition, implementations herein enable clients to have control over usage of keys, maintain key provenance, and manage keys from a central key management service or system.

Figure 1A:
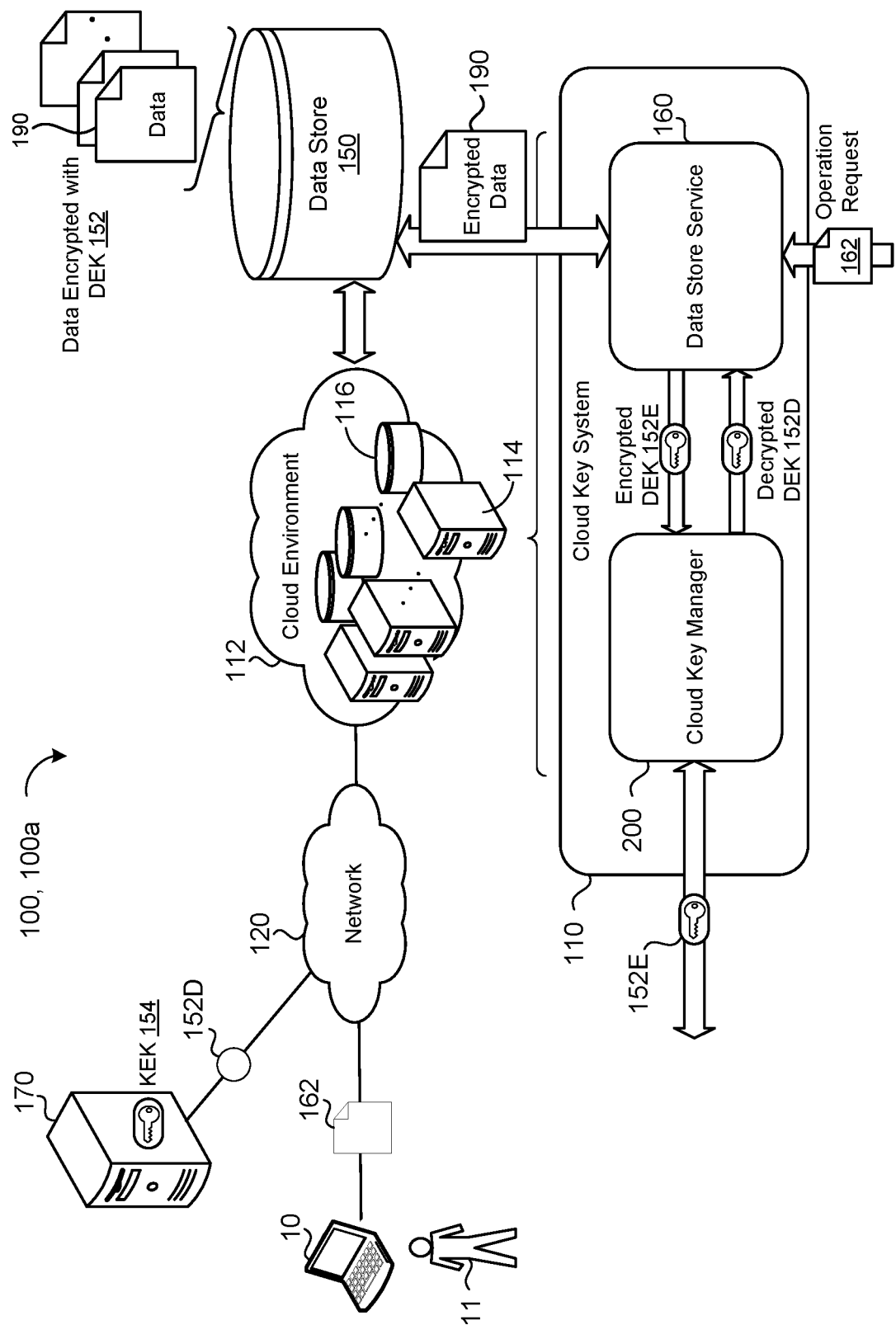
FIGS. 1A and 1B are schematic views of an example cloud key system that provides integration of third-party encryption key managers.
Figure 1B:
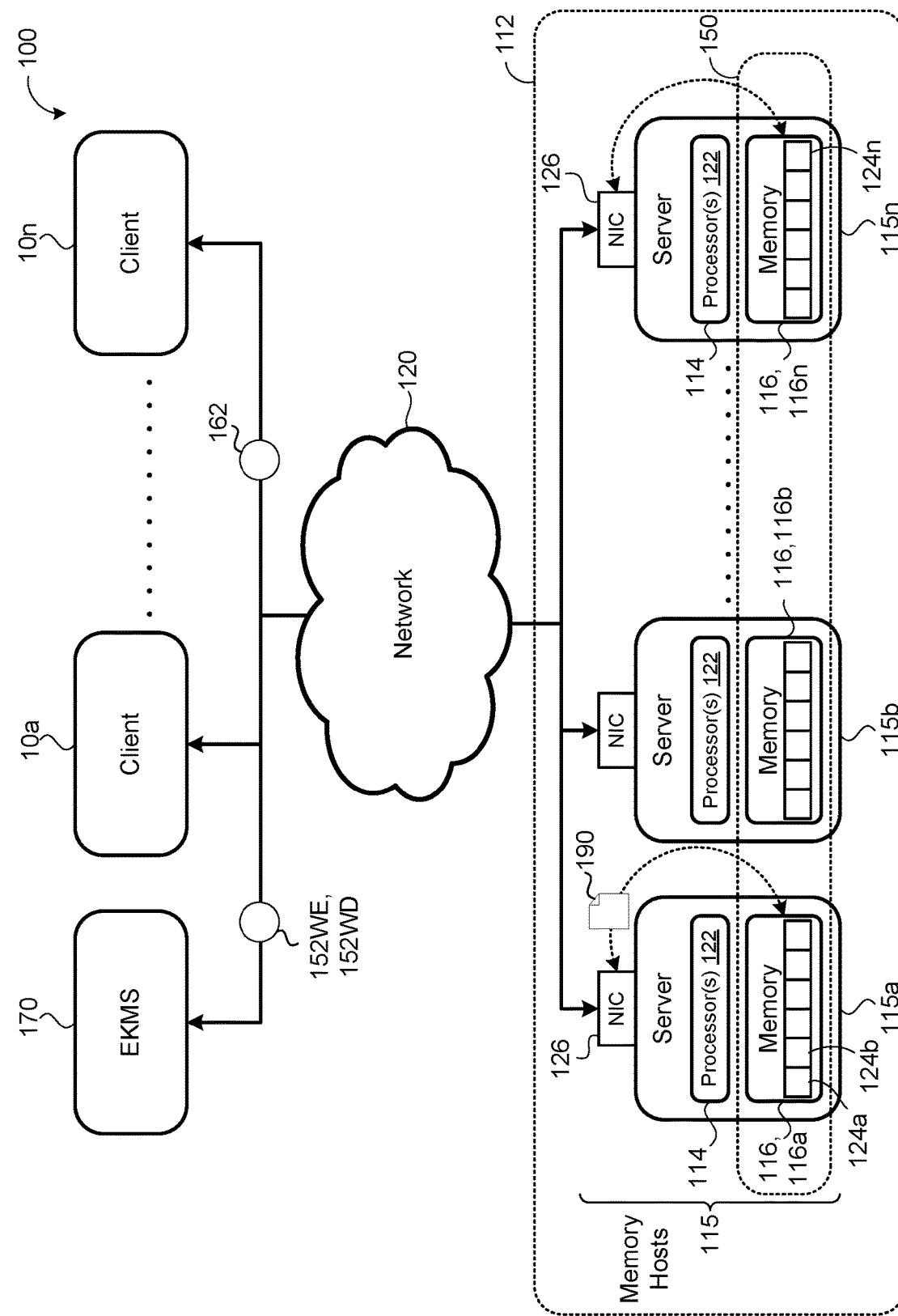

Referring to FIGS. 1A and 1B, in some implementations, an example system 100 includes one or more clients 10, 10a-n (e.g., client devices) each associated with a corresponding customer 11, who may communicate, via a network 120, with a remote system 112. The remote system 112 may be a single computer, multiple computers, or a distributed system (e.g., a cloud environment) having scalable/elastic computing resources 114 (e.g., data processing hardware 610 (FIG. 6)) and/or storage resources 116 (e.g., memory hardware 620 (FIG. 6)). A storage abstraction 150 (e.g., a distributed storage system or a data store) is overlain on the storage resources 116 to allow scalable use of the storage resources 116 by one or more of the clients 10. Data 190 stored in the data store 150 is defined as "data at rest." Data at rest refers to all data that is not currently traversing a network or temporarily residing in computer memory. The remote system 112 may support a plurality of independent clients. For example, the remote system 112 may represent a "cloud" computing system (i.e., a distributed system) that stores data (i.e., data at rest) for many different clients.

The remote system 112 executes a cloud key system 110 that includes one or more data store services 160. In the example shown, the data store service 160 receives an operation request 162 from the client 10 that requests the data store service 160 to read/write data 190 from/to the data store 150. The data 190 stored within the data store 150 is encrypted using a data encryption key (DEK) 152. That is, the data store service 160, prior to writing data 190 to the data store 150, may encrypt the data using the DEK 152. Similarly, after retrieving encrypted data 190 from the data store 150, the data store service 160 may decrypt the data 190 using the DEK 152. In some examples, the DEK 152 is a symmetric cryptographic key (e.g., an AES256 key). A symmetric key is a key that is used to both encrypt and decrypt data. In other examples, the DEK 152 includes a pair of asymmetric keys where one key encrypts the data and one key decrypts the data. The data store service 160 may store any number of DEKs 152 with each DEK 152 corresponding to a respective portion of the encrypted data 190 stored within the data store 150. The DEK 152 may also be referred to as a 'cryptographic key' 152.

Each DEK 152 is stored by the cloud key system 110 in an encrypted format. That is, the DEK 152, when at rest within the cloud key system 110, is always encrypted. In some examples, the DEK 152 is encrypted using a key encryption key (KEK) 154. The KEK 154 is a customer-controlled key and thus, the term "customer key" may be used herein to refer to the KEK 154. Here, prior to the data store service 160 encrypting or decrypting data 190 using the DEK 152, the encrypted DEK 152E must be decrypted using the KEK 154. The decrypted DEK 152D may then be used to encrypt or decrypt the data 190. The KEK 154 is only stored external or independent to the remote system 112 and the cloud key system 110 never has access to the KEK 154. For example, the KEK 154 may be stored at a remote entity 170. The remote entity 170 may be referred to as an external key management system (EKMS) 170 or a remote key manager or a third party key manager. Notably, due to the external nature of the EKMS 170, the data store service 160 does not have access to the KEK 154 and must rely on the EKMS to decrypt the DEK 152E before encrypting or decrypting data 190 using the decrypted DEK 152D. Note that external in this case does not necessarily imply that the remote entity 170 is geographically remote from the remote system 112, but instead is remote in that it is separate hardware not under the control of the remote system 112. In some implementations, the remote entity 170 may be co-located (e.g., in the same facility) as the remote system 112. In some examples, the EKMS 170 includes a hardware security module (HSM). An HSM is a physical computing device that protects and manages digital cryptographic keys and may include cryptoprocessing. Typically, HSMs include secure crytoprocessor chips. For example, one or more HSMs may be co-located in a site geographically near the remote system 112.

The cloud key system 110 also includes a cloud key manager 200. When the data store service 160 needs an encrypted DEK 152 decrypted for decrypting/encrypting data 190, the data store service 160 sends the appropriate encrypted DEK 152E (which has been encrypted by the KEK 154) to the cloud key manager 200 to transmit the encrypted DEK 152E to the EKMS 170 via the network 120. In some examples, the cloud key manager 200 transmits the key 152E using Hypertext Transfer Protocol Secure (HTTPS). The cloud key manager 200 and the EKMS 170 may communicate via a representational state transfer (REST) application programming interface (API). Optionally, the EKMS 170 may be accessible via public endpoint (i.e., a public IP address) that has a public domain name and a transport layer security (TLS) certificate for the domain name rooted in a public certificate authority (CA).

In the example shown, the EKMS 170 uses the KEK 154 to decrypt the encrypted DEK 152E. The remote system 112 is incapable of performing this decryption, as the remote system 112 does not have access to the KEK 154. After decryption, the EKMS 170 transmits the decrypted DEK 152D to the cloud key manager 200 and the cloud key manager 200 may pass the decrypted DEK 152D to the data store service 160 for performing or executing the operation request 162 (i.e., encrypt and write data or decrypt and read data at rest 190). After the data store service 160 completes execution of the operation request 162, the data store service 160 discards (i.e., does not store or cache) the decrypted DEK 152D such that the data store service 160 must request (via the cloud key manager 200) the decrypted DEK 152 again for future operation requests 162. That is, the remote system 112 only maintains a copy of the encrypted DEK 152E permanently (for future decryption requests to the EKMS 170) and does not maintain a copy of the decrypted DEK 152D.

In some implementations, the cloud key system 110 may originate the DEK 152. For example, when a client 11 desires to encrypt plaintext data stored at the data store 150, the cloud key system 110 may generate a DEK 152 and subsequently encrypt the data 190. After encryption, the cloud key manager 200 may send the DEK 152 to the EKMS 170 to encrypt the DEK 152 with the KEK 154, which in turn transmits the encrypted DEK 152 back to the cloud key manager 200. At this point, the cloud key system may discard any plaintext or unencrypted versions of the DEK 152 and only store the encrypted DEK 152 (i.e., encrypted by the KEK 154) in preparation for an operation request 162.

Referring to FIG. 1B, in some implementations, the distributed system 112 includes loosely coupled memory hosts 115, 115a-n (i.e., data processing hardware)), each having a computing resource 114 (e.g., one or more processors or central processing units (CPUs)) in communication with storage resources 116 (e.g., memory hardware, flash memory, dynamic random access memory (DRAM), phase change memory (PCM), and/or disks) that may be used for caching data. The storage abstraction 150 overlain on the storage resources 116 allows scalable use of the storage resources 116 by one or more clients 10, 10a-n. The clients 10 may communicate with the memory hosts 115 through the network 120 (e.g., via remote procedure calls (RPC)). In some implementations, the remote distributed system 112 is "single-sided." "Single-sided" refers to the method by which most of the request processing on the memory hosts 114 may be done in hardware rather than by software executed on CPUs 122 of the memory hosts 114.

The distributed system 112 may store data 190 obtained from clients 10 into the storage resources 116 (e.g., storage abstraction 150) of the remote memory hosts 115 and get the data 190 from the remote memory hosts 115 via network interface controllers (NIC) 126. Once stored, the data is defined as data at rest. A network interface controller 126 (also known as a network interface card, network adapter, or LAN adapter) may be a computer hardware component that connects a computing device/resource 114 to the network 120. Both the memory hosts 115a-n and the clients 10 may each have a network interface controller 126 for network communications. Each memory location 124, 124a-n is configured to store a portion of the data 190.

Referring now to FIG. 2, in some implementations, the cloud key manager includes an inner encryption key (IEK) 156. The IEK 156 may be a symmetric (e.g., AES256) key that provides additional encryption to the DEK 152. For example, all data (e.g., the DEK 152) sent to the EKMS 170 by the cloud key manager 200 may first be encrypted by the IEK 156. For example, prior to the cloud key manager 200 transmitting an unencrypted DEK 152 to the EKMS 170 for initial encryption by the KEK 154, the cloud key manager 200 may encrypt the DEK 152 with the IEK 156. The IEK 156 is unavailable to the EKMS 170. This ensures that the EKMS 170 does not have access to a plaintext version of the DEK 152, as when received by the EKMS 170, the DEK 152 will be encrypted by the IEK 156. The EKMS 170 may then encrypt the DEK 152 with the KEK 154, which will now have two layers of encryption (i.e., via the IEK 156 and the KEK 154). The cloud key manager 200 may store the DEK 152 with both layers of encryption. When an operation request 162 is received, the cloud key manager 200 may send the DEK 152 (with both layers of encryption) to the EKMS 170 which decrypts the DEK 152 using the KEK 154. The EKMS 170 may then send the DEK 152 (now only encrypted with the IEK 156) to the cloud key manager 200. Again, the EKMS 170 never has access to the DEK 152 in plaintext. The cloud key manager 200 may then decrypt the DEK 152 with the IEK 156 to retrieve the plaintext DEK 152, which may then be used to execute the operation request 162.

Still referring to FIG. 2, the cloud key system 110 executing on the remote system 112, in some implementations, further includes a cloud authenticator 220. The cloud authenticator 220 may authenticate an identity 221 of the cloud key system 110 to the EKMS 170 to authorize use of the KEK 154 for encrypting/decrypting the DEK 152. In some examples, the cloud authenticator 220 includes a cloud identity and access management (IAM) module. The cloud authenticator 220 may utilize any number of means of authentication. For example, the cloud authenticator 220 may implement an OpenID Connect (OIDC) authentication protocol. In this case, every request to the EKMS 170 will include an OpenID Connect token associated with an account of the client 10. In other examples, the cloud authenticator 220 stores other credentials (e.g., a password) to an account on the EKMS 170 or a private key corresponding a TLS certificate trusted by the EKMS 170. This enables the cloud key system 110 to assert identity and/or authority to the EKMS 170 to further secure the system from attacks (e.g., confused deputy attacks). The cloud authenticator 220 ensures that the identity of the cloud key system 110 is externally verifiable (e.g., by the clients 10).

In some examples, before the cloud key manager 200 sends an encrypted DEK 152E for the EKMS 170 to decrypt using the KEK 154, the cloud authenticator 220 transmits an authentication request 222 to the EKMS 170. The cloud authenticator 220 may transmit the request 222 in response to a request 210 from the cloud key manager 200. The authentication request 222 may be based on the identity 221 of the cloud key system or a client or customer 11 associated with the KEK 154 or DEK 152 (i.e., a user authorized to access the data 190). One or more identities 221 may be stored at the cloud authenticator 220. The authentication request 222 may include any information necessary for the EKMS 170 to authenticate the identity 221 and/or cloud key system 110 (identification, password, signature, a key, etc.). Optionally, the EKMS 170, after authentication, transmits authentication results 224 back to the cloud authenticator 220. The authentication results 224 may indicate whether the authentication was successful and include additional information detailing the authentication (e.g., pass/fail, timestamps, error codes, reasons for failing, etc.). The cloud authenticator may transmit a status of the authentication 212 to the cloud key manager. The cloud authenticator 220 may also authenticate the EKMS 170 to help ensure that the cloud key system 110 is communicating with the intended EKMS 170 (e.g., via the TLS certificate, etc.). In some implementations, after receiving the decrypted DEK 152 from the EKMS 170 (i.e., the remote entity 170), the cloud authenticator 220, via message authentication, authenticates the transmission from the EKMS 170. That is, the cloud authenticator 220 may verify that the DEK 152 originated from the EKMS 170 and was not modified in transit. Message authentication may be implemented in a number of ways (e.g., message authentication codes, digital signatures, etc.). Information regarding authentication (e.g., success, failure, reasons for failure, etc.) may be provided as a notification to an associated client 10 and/or logged for auditing purposes.

The EKMS 170 may include a key access policy 230 (i.e., an authorization policy 230) that evaluates the authentication request 222 from the cloud key system 110 and determines whether the cloud key system 110 or the client 11 associated with the operations request 162 is authorized to access the decrypted DEK 152D. For example, the key access policy 230 may authorize the cloud key system 110 (i.e., from the cloud authenticator 220) or client 11 (e.g., via the identity 221) and determine that the cloud key system 110 or client 11 is authorized to access the respective DEK 152. The key access policy 230 may set any number of conditions before granting or denying access to the KEK 154. For example, the conditions may include temporal conditions (e.g., a time of day), frequency of requests conditions, etc. The key access policy 230 may manage any number of keys 152, 154. In some examples, the EKMS 170 denying the cloud key system 110 access to the decrypted DEK 152D prevents the data store service 160 from accessing the associated data at rest. In these examples, when the EKMS 170 restores access to the KEK 154 (i.e., approves decryption of the DEK 152), access to the data may be restored.

Figure 3:
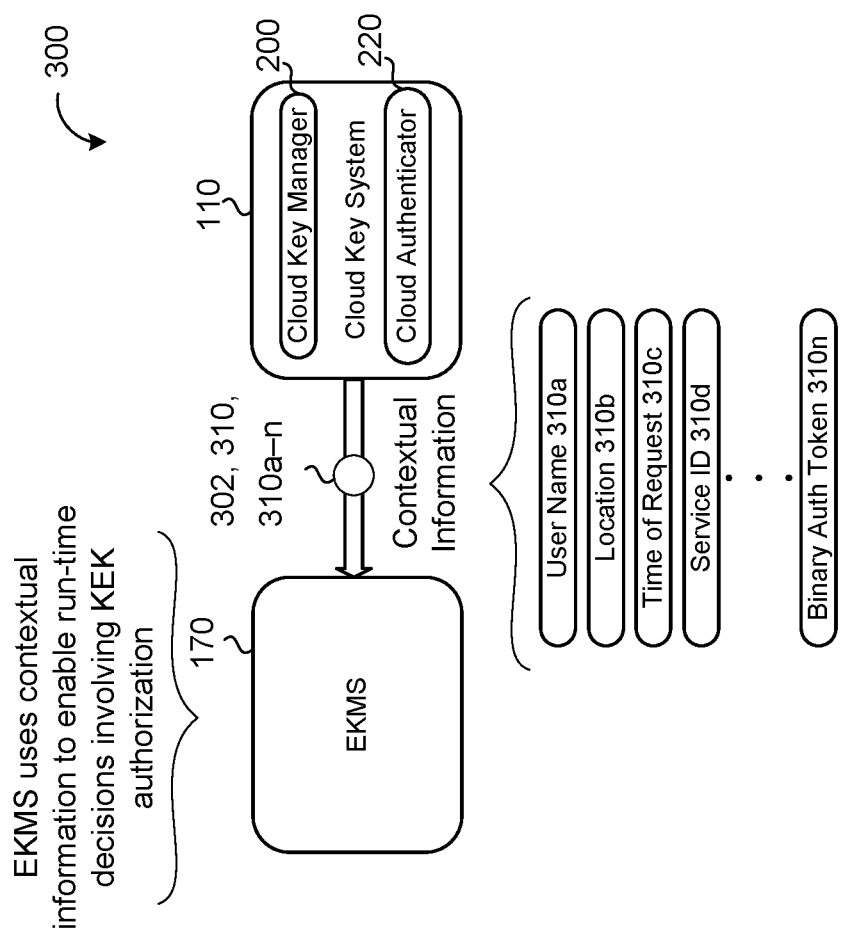
FIG. 3 is a schematic view of a cloud key system exchanging contextual information with an external key management system.

Referring now to FIG. 3, in some implementations, a schematic view 300 shows the cloud key system 110, when sending a key decryption request 302 to the EKMS 170 requesting the EKMS 170 to decrypt an encrypted DEK 152E using the KEK 154, providing additional contextual information 310, 310*a*-*n* to enable the EKMS 170 to make run-time decisions as to whether to decrypt the DEK 152. The key decryption request 302 may include the encrypted DEK 152E that the cloud key manager 200 wants the EKMS 170 to decrypt using the associated KEK 154. Additionally or alternatively, the key decryption request 302 may include the authentication request 222 (from the cloud authenticator 220) containing the information necessary for the EKMS 170 to authenticate the cloud key system 110. The contextual information 310 may include, but is not limited to, a user name 310*a* associated with the client 10 (or the operation request 162) making the request, a location 310*b* associated with the client 10 or operations request 162, a time of request 310*c* (i.e., a timestamp associated with the operation request 162), a data store service or data store identifier (ID) 310*d* (i.e., a unique identifier identifying the data store service 160 or the data store 150 associated with the operation request 162), and/or a binary authorization token 310*n*. In some examples, the binary authorization token 310*e* is configured to enable access sovereignty. Optionally, the contextual information 310 includes a purpose for the operation. For example, the contextual information 310 may indicate that the operation is an end-user initiated request (i.e., from a client 10), or a system-initiated request, or neither.

Accordingly, the system 100 enables clients to store and process data in a cloud environment while maintaining strict access control over the data. The client may revoke (and later re-enable) access to the client's data at any time to prevent all parties, including the cloud service provider, from accessing the data at rest. The system 100 also enables the client to demonstrate key provenance, key location, and maintain complete knowledge of usage of keys used to encrypt/decrypt the client's data and allows for thorough auditing of key access and usage. Clients are capable of using the same key management system with the system 100 and on-premise workloads and/or other cloud developments so that keys are managed in a single place. Additionally, the system 100 enables clients to enforce authorization policies on decryption of data at rest and make run-time decisions involving data decryption.

Figure 4:
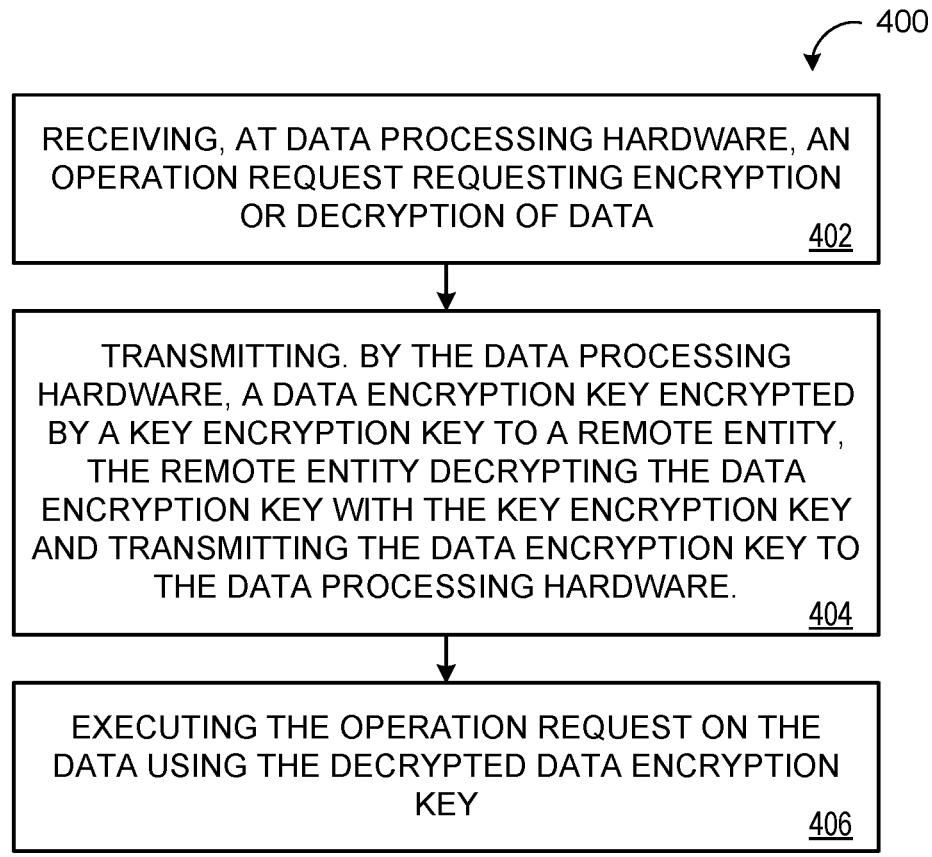
FIG. 4 is a flowchart of an example arrangement of operations for a method of integrating third-party encryption key managers with cloud services.

FIG. 4 is a flowchart of an exemplary arrangement of operations for a method 400 of integrating a third-party encryption key manager with a cloud service. The method 400 starts at operation 402 with receiving, at data processing hardware 114, an operation request 162 requesting a cryptographic operation on data 190. The cryptographic operation includes an encryption operation or a decryption operation. At operation 404, the method 400 includes transmitting, by the data processing hardware 114, a data encryption key 152E to a remote entity 170. The data encryption key 152E is encrypted by a key encryption key 154 and is associated with the data. The data encryption key 152E causes the remote entity to decrypt the data encryption key 152E using a key encryption key 154. The key encryption key 154 is unavailable to the data processing hardware 114 (e.g., the remote entity 170 restricts the cloud key system 110 from accessing the key encryption key 154). The remote entity 170 also transmits the decrypted data encryption key 152D to the data processing hardware 114. At operation 406, the method includes executing, by the data processing hardware 114, the cryptographic operation on the data 190 using the decrypted data encryption key 152D.

Figure 5:
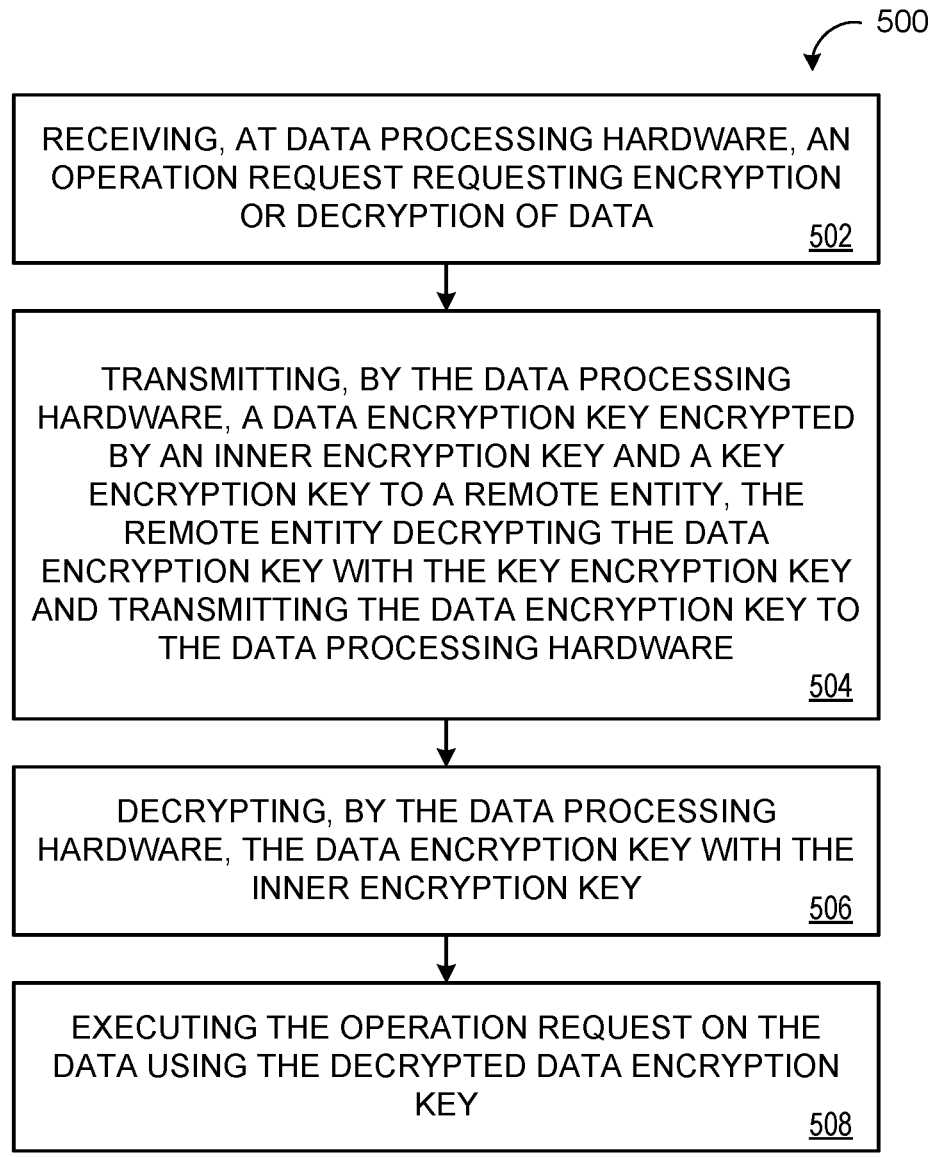
FIG. 5 is a flowchart of an example arrangement of operations for a method of integrating third-party encryption key managers with cloud services.

FIG. 5 is another flowchart of an exemplary arrangement of operations for a method 500 of integrating a third-party encryption key manager with a cloud service. The method 500 starts at operation 502 with receiving, at data processing hardware 114, an operation request 162 requesting a cryptographic operation on data 190. The cryptographic operation includes an encryption operation or a decryption operation. At operation 504, the method 500 includes transmitting, by the data processing hardware 114, a data encryption key 152E to a remote entity 170. The data encryption key 152E is associated with the data and is encrypted by both an inner encryption key 156 and a key encryption key 154. The data encryption key 152E causes the remote entity to decrypt the data encryption key 152E using the key encryption key 154. The key encryption key 154 is unavailable to the data processing hardware 114 (e.g., the remote entity 170 restricts the cloud key system 110 from accessing the key encryption key 154). The remote entity 170 also transmits the decrypted data encryption key 152WD to the data processing hardware 114.

At operation 506, the method 500 includes decrypting, by the data processing hardware 114, the data encryption key 152D using the inner encryption key 156, and, at operation 508, executing, by the data processing hardware 114, the cryptographic operation on the data 190 using the decrypted data encryption key 152D.

Figure 6:
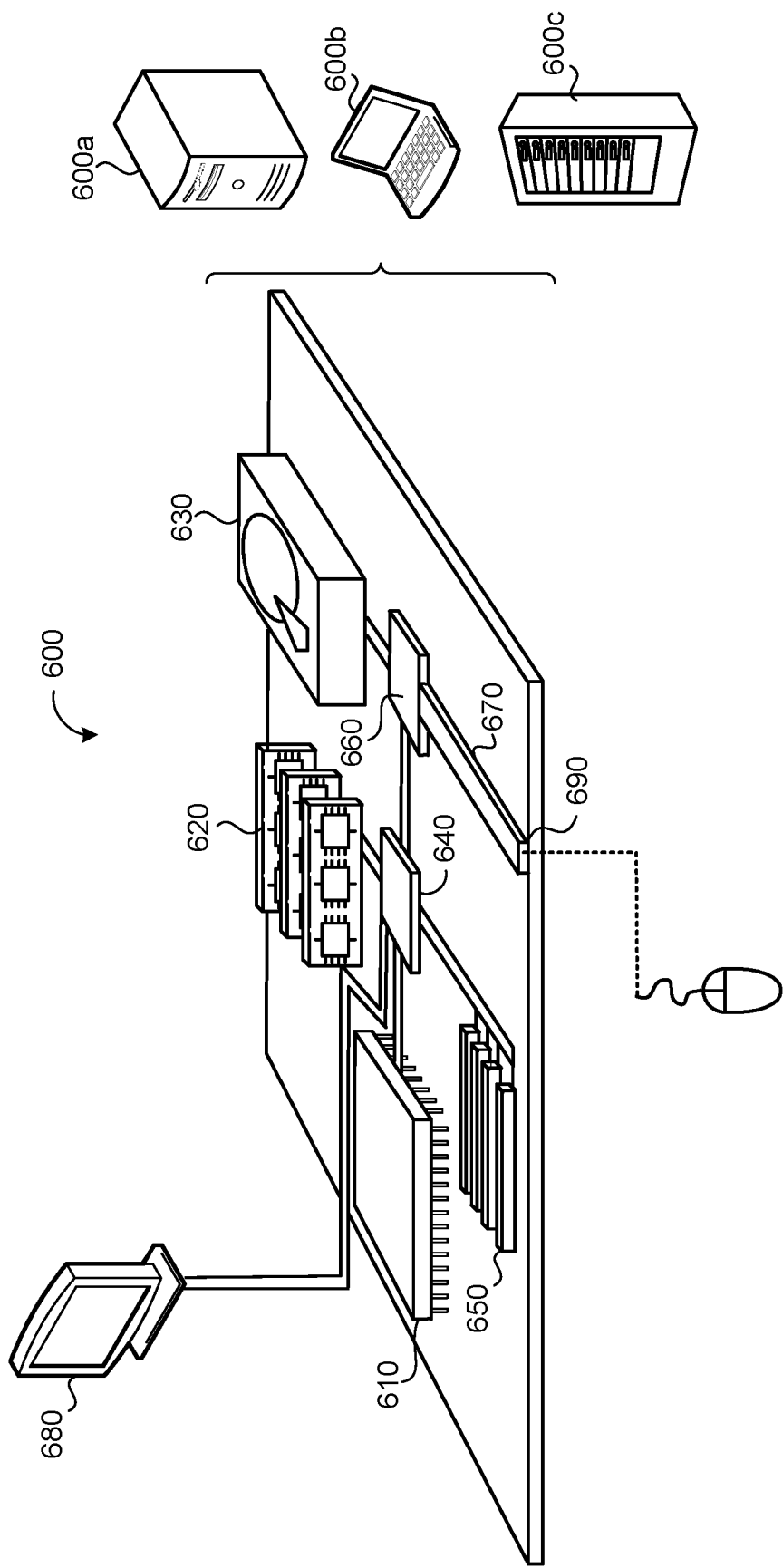
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, from a remote entity, an encrypted data encryption key encrypted by the remote entity, the encrypted data encryption key encrypted with a key encryption key unavailable to the data processing hardware;
   after receiving the encrypted data encryption key, receiving an operation request requesting a cryptographic operation on data; and
   in response to receiving the operation request:
      transmitting, to the remote entity, a decryption request requesting decryption of the encrypted data encryption key, the decryption request comprising an authentication request based on contextual information associated with a client, the client associated with the key encryption key, wherein the authentication request is based on an identity of the client, the authentication request, when received by the remote entity, further causing the remote entity to authenticate the identity;
      based on transmitting the decryption request to the remote entity, receiving, from the remote entity, a decrypted data encryption key from the remote entity, the decrypted data encryption key comprising the encrypted data encryption key decrypted with the key encryption key;
      determining that the received decrypted data encryption key is from the remote entity;
      verifying that the received decrypted data encryption key is unmodified during transit from the remote entity to the data processing hardware;
      executing, using the decrypted data encryption key, the cryptographic operation on the data; and
      after executing the cryptographic operation on the data, discarding the decrypted data encryption key.

2. The method of claim 1, wherein the operations further comprise decrypting the decrypted data encryption key received from the remote entity with an inner encryption key, the inner encryption key unavailable to the remote entity.

3. The method of claim 1, wherein the remote entity authenticates the identity by applying an authorization policy to the authentication request, the authorization policy comprising permit criteria.

4. The method of claim 1, wherein the remote entity authenticates the data processing hardware based on the contextual information.

5. The method of claim 1, wherein the contextual information comprises at least one of a user name associated with the operation request, a location associated with the operation request, a timestamp associated with the operation request, a data store identifier, or a binary authorization token.

6. The method of claim 1, wherein the contextual information comprises a purpose for the cryptographic operation.

7. The method of claim 6, wherein the purpose indicates that the cryptographic operation is an end-user initiated request or a system-initiated request.

8. The method of claim 1, wherein the data processing hardware comprises a distributed system supporting a plurality of independent clients.

9. The method of claim 1, wherein the cryptographic operation comprises a cryptographic signature operation.

10. A system comprising:
    data processing hardware; and
    memory hardware in communication with the data processing hardware, the memory hardware storing instructions that when executed on the data processing hardware cause the data processing hardware to perform operations comprising:
       receiving, from a remote entity, an encrypted data encryption key encrypted by the remote entity, the encrypted data encryption key encrypted with a key encryption key unavailable to the data processing hardware;
       after receiving the encrypted data encryption key, receiving an operation request requesting a cryptographic operation on data; and
       in response to receiving the operation request:
          transmitting, to the remote entity, a decryption request requesting decryption of the encrypted data encryption key, the decryption request comprising an authentication request based on contextual information associated with a client, the client associated with the key encryption key, wherein the authentication request is based on an identity of the client, the authentication request, when received by the remote entity, further causing the remote entity to authenticate the identity;
          based on transmitting the decryption request to the remote entity, receiving, from the remote entity, a decrypted data encryption key from the remote entity, the decrypted data encryption key comprising the encrypted data encryption key decrypted with the key encryption key;
          determining that the received decrypted data encryption key is from the remote entity;
          verifying that the received decrypted data encryption key is unmodified during transit from the remote entity to the data processing hardware;
          executing, using the decrypted data encryption key, the cryptographic operation on the data; and
          after executing the cryptographic operation on the data, discarding the decrypted data encryption key.

11. The system of claim 10, wherein the operations further comprise decrypting the decrypted data encryption key received from the remote entity with an inner encryption key, the inner encryption key unavailable to the remote entity.

12. The system of claim 10, wherein the remote entity authenticates the identity by applying an authorization policy to the authentication request, the authorization policy comprising permit criteria.

13. The system of claim 10, wherein the remote entity authenticates the data processing hardware based on the contextual information.

14. The system of claim 10, wherein the contextual information comprises at least one of a user name associated with the operation request, a location associated with the operation request, a timestamp associated with the operation request, a data store identifier, or a binary authorization token.

15. The system of claim 10, wherein the contextual information comprises a purpose for the cryptographic operation.

16. The system of claim 15, wherein the purpose indicates that the cryptographic operation is an end-user initiated request or a system-initiated request.

17. The system of claim 10, wherein the data processing hardware comprises a distributed system supporting a plurality of independent clients.

18. The system of claim 10, wherein the cryptographic operation comprises a cryptographic signature operation.

* * * * *